Oct. 24, 1967  J. ULDERUP  3,348,864
COUPLING MEMBER AND PROCESS FOR MAKING SAME
Filed March 27, 1963
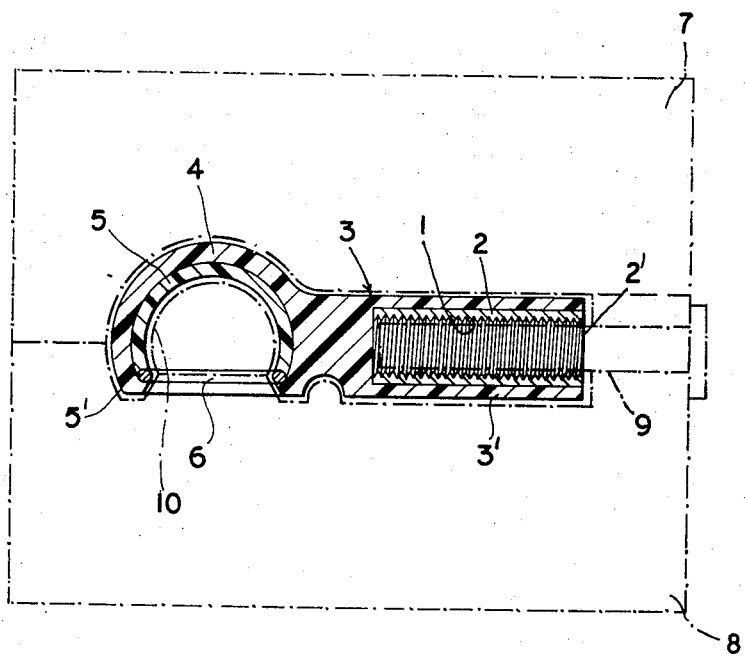
JÜRGEN ULDERUP
INVENTOR.
BY Karl J. Ross
AGENT 3,348,864
COUPLING MEMBER AND PROCESS FOR
MAKING SAME
Jürgen Ulderup, Lemforde, Hannover 207, Germany
Filed Mar. 27, 1963, Ser. No. 268,252
Claims priority, application Germany, Mar. 29, 1962,
L 41,603
4 Claims. (Cl. 287—90)

ABSTRACT OF THE DISCLOSURE

A coupling member for a universal joint, comprising a spherically concave bearing shell encompassing slightly more than a hemisphere, the shell being bounded by a circular rim with a diameter slightly less than the diameter of the interior of the shell; a tube spacedly aligned with the shell and extending substantially radially thereof and parallel to the plane of the rim; a body of synthetic resinous material enveloping the shell and the tube while leaving said rim and an end of the tube remote from the shell exposed, said body having a generally spheroidal portion surrounding said shell and forming a mouth converging inwardly toward said ring; and a metallic guard ring lodged in the body adjacent said rim, said ring having an inner diameter slightly less than that of the rim and being spreadable against the surrounding resinous material.

---

My present invention relates to a coupling member for a mechanical joint, preferably one of the universal type, whose bearing shell is to be connected by such member to a pitman or similar elongated element.

Such coupling members, particularly for automotive vehicles, have heretofore been made as unitary metallic bodies, one end of the body being often provided with a cylindrical bore adapted to receive (usually by threaded engagement) an extremity of the elongated transmission element, the other end of the body being formed as a bearing shell complementary to a knuckle-shaped or ball-shaped mating extremity of another transmission element (e.g. a crank). Such unitary coupling members have been difficult and wasteful to machine so that their manufacture has been relatively expensive.

A principal object of my invention is to provide an improved and more economical process for making coupling members of the type referred to, particularly but not exclusively for the fuel-control and gear-shift mechanisms of automotive vehicles.

Another important object of the instant invention is to provide a coupling member of this character, producible by my improved process, which is of light weight but sturdy construction and which can be quickly and easily assembled into a joint or disassembled for inspection and replacement of parts.

In the preferred mode of realization of this invention I provide a plurality of separate inserts, including at least a bearing shell and a preferably metallic internally threaded tube or ferrule, held together by a body of macromolecular polymeric material which is so formed around them as to leave the interiors of the bearing shell and the tube accessible from without. The formation of the polymeric body is advantageously carried out by a molding process (either injection or compression) though at least in some cases it will also be possible to adhere the polymeric material to the inserts by a pressing operation between suitable clamping jaws. The tube may be cut from prethreaded tubular stock.

In the case of a universal joint, the bearing shell is made spherically concave and designed to encompass slightly more than a hemisphere so that its mouth forms a circular rim whose radius is a little shorter than the radius of the sphere. Next to this mouth I prefer to position a guard ring, of still slightly smaller diameter, such as a conventional wire loop or spring ring adapted to be spread radially upon the introduction of the male joint member. The spreading of the ring and of the shell mouth is resiliently resisted by the surrounding plastic material so that shell and ring will close snugly around the ball or knuckle head of the male joint member, thereby securely holding the assembly together.

The shell-forming insert may be a relatively thin layer of a low-friction material such as, for example, polytetrafluorethylene.

Polymeric materials suitable for making the plastic body include such macromolecular substances as polyurethane, polyesters and epoxy resins, preferably reinforced by filamentary strands such as glass fibers.

The invention will be described in greater detail with reference to the accompanying drawing whose sole figure illustrates, in longitudinal section, a coupling member representing a preferred embodiment.

The coupling member shown in the figure comprises, within a resinous body 3, a plurality of separate inserts including a metal tube 2, a bearing shell 5 and a preadable guard ring 6. Shell 5 rests against a cylindrical surface 4 of the body 3 forming a socket therefor. Tube 2, which is provided with internal screw threads 1, has an open end 2' and is oriented with its axis extending radially of the shell 5 whose slightly constricted mouth 5' lies in the plane parallel to the tube axis. The guard ring 6 is disposed next to the shell rim forming the mouth 5' and is in turn imbedded in the plastic mass so as to remain locked within body 3. The interior of shell 5 is, nevertheless, fully accessible from without.

The body 3 may be integrally molded about the inserts 2, 5 and 6 between mold halves indicated diagrammatically at 7 and 8. A mandrel 9 may be temporarily introduced into the tube or ferrule 2 to stiffen it against the molding pressure and to prevent the entrance of plastic material; this mandrel is advantageously secured to one of the mold halves, e.g. mold half 8, to locate the ferrule 2 positively within the mold cavity. A core 10 on mold half 8, also serving as a locator and stiffener, enters the cavity of shell 5 in much the same manner as the ball head of a joint member to be subsequently received by it; upon completion of the molding operation, this core (if not deflatable) can be forcibly withdrawn as the guard ring 6 and the shell mouth 5' yield resiliently against the surrounding plastic. The elements 7 and 8 can also be considered representative of two relatively movable press parts or jaws between which the resinous body 3, composed in this instance of several sections, is forced to adhere to the inserts 2, 5 and 6.

The process here described may also be used to form a coupling member which lacks the tubular insert 2, e.g. in cases where the extremity 3' of body 3 is to be attached with forced fit or in some other manner to a surrounding tubular transmission element. Extremity 3' will, of course, be solid if the tube 2 is omitted from the cavity of mold 7, 8 during the formation of body 3.

Other modifications of the structure and process herein disclosed will be apparent to persons skilled in the art and are intended to be embraced within the spirit and scope of the invention as defined in the appended claims.

I claim:
1. A coupling member for a universal joint, comprising a spherically concave bearing shell encompassing slightly more than a hemisphere, said shell being bounded by a circular rim with a diameter slightly less than the diameter of the interior of said shell; a tubular insert spacedly aligned with the shell and extending substantially radially thereof and parallel to the plane of the rim; a body of synthetic resinous material enveloping said shell and said tube while conforming thereto and leaving said rim and an end of said tube remote from said shell exposed; and a flexible metallic guard ring embedded in said body adjacent said rim, said ring having an inner diameter slightly less than that of said rim and being spreadable against the surrounding resinous material, said body having a generally spheroidal portion surrounding said shell and forming a mouth converging inwardly toward said ring.

2. A coupling member as defined in claim 1 wherein said shell consists of polytetrafluorethylene.

3. A coupling member as defined in claim 1 wherein said body is internally reinforced by filaments embedded in said polymeric material.

4. A coupling member as defined in claim 1 wherein said insert is internally threaded.

References Cited

UNITED STATES PATENTS

| | | | |
|---|---|---|---|
| 1,372,177 | 3/1921 | Lopez | 308—173 |
| 1,776,412 | 9/1930 | Bresien | 308—173 |
| 2,305,815 | 12/1942 | Schwarz | 287—90 |
| 2,934,350 | 4/1960 | Herbenar | 287—90 X |
| 3,061,329 | 10/1962 | Hintzen | 287—90 X |
| 3,109,702 | 11/1963 | Hosbein et al. | 264—277 |
| 3,114,598 | 12/1963 | Beckadolph et al. | 264—277 |
| 3,147,537 | 9/1964 | Fadow | 287—90 X |
| 3,155,014 | 11/1964 | Genz. | |

FOREIGN PATENTS

| | | |
|---|---|---|
| 1,276,271 | 10/1961 | France. |
| 591,374 | 4/1959 | Italy. |

CARL W. TOMLIN, *Primary Examiner.*

A. H. BRODRMERKEL, *Examiner.*

A. V. KUNDRAT, F. MARLOWE,
*Assistant Examiners.*